(12) United States Patent
Ploennigs et al.

(10) Patent No.: US 11,132,510 B2
(45) Date of Patent: Sep. 28, 2021

(54) INTELLIGENT MANAGEMENT AND INTERACTION OF A COMMUNICATION AGENT IN AN INTERNET OF THINGS ENVIRONMENT

(71) Applicant: INTERNATIONAL BUSINESS MACHINES CORPORATION, Armonk, NY (US)

(72) Inventors: Joern Ploennigs, Dublin (IE); William Lynch, Rathkeale (IE); Fabio Lorenzi, Tyrrelstown (IE); Michael Barry, Limerick (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 16/262,499

(22) Filed: Jan. 30, 2019

(65) Prior Publication Data
US 2020/0242199 A1    Jul. 30, 2020

(51) Int. Cl.
*G06F 40/30* (2020.01)
*G06F 40/295* (2020.01)
*G06N 5/02* (2006.01)
*G06N 20/00* (2019.01)

(52) U.S. Cl.
CPC ............ *G06F 40/30* (2020.01); *G06F 40/295* (2020.01); *G06N 5/02* (2013.01); *G06N 20/00* (2019.01)

(58) Field of Classification Search
CPC ......... G06F 40/30; G06F 40/295; G06N 5/02; G06N 20/00

USPC ........................................................... 704/9
See application file for complete search history.

(56) References Cited

U.S. PATENT DOCUMENTS

| | | | |
|---|---|---|---|
| 7,624,080 B1 * | 11/2009 | Morales | G06N 5/02 706/20 |
| 9,297,723 B1 * | 3/2016 | Hofmann | G06N 20/00 |
| 9,602,505 B1 * | 3/2017 | Schulman | H04L 63/0838 |
| 9,716,675 B2 * | 7/2017 | Choi | H04L 12/1818 |
| 10,057,125 B1 * | 8/2018 | Roman | H04W 8/005 |
| 10,120,864 B2 * | 11/2018 | Sandor | G06F 16/2455 |
| 10,410,129 B2 * | 9/2019 | Yeung | G06F 1/163 |
| 2007/0226796 A1 * | 9/2007 | Gilbert | H04L 63/1425 726/22 |
| 2013/0204813 A1 * | 8/2013 | Master | G06N 20/00 706/12 |

(Continued)

FOREIGN PATENT DOCUMENTS

EP      3316140 A1 *  5/2018   ......... H04L 67/1002
WO   2018155920 A1   2/2018

*Primary Examiner* — Edwin S Leland, III
(74) *Attorney, Agent, or Firm* — Griffiths & Seaton PLLC

(57) ABSTRACT

Various embodiments are provided for managing and interacting with a conversational agent in an internet of things (IoT) environment by a processor. One or more graph patterns may be extracted from a knowledge graph generated from a sensor list containing one or more IoT sensors. One or more conversation patterns and conversation dialogs may be learned from the sensor list and graph patterns. The conversational agent may be automatically configured with the one or more graph patterns, the one or more conversational patterns and conversation dialogs, sensor data and analytics from the one or more IoT sensors according to one or more queries to engage in a conversation dialog with a user.

20 Claims, 13 Drawing Sheets

(56) References Cited

U.S. PATENT DOCUMENTS

| | | | | |
|---|---|---|---|---|
| 2013/0268260 | A1* | 10/2013 | Lundberg | G06F 40/40 |
| | | | | 704/8 |
| 2015/0118658 | A1* | 4/2015 | Mayou | A61B 5/165 |
| | | | | 434/127 |
| 2016/0378080 | A1* | 12/2016 | Uppala | G10L 15/22 |
| | | | | 700/275 |
| 2017/0163435 | A1* | 6/2017 | Ehsani | G06F 40/35 |
| 2017/0265785 | A1* | 9/2017 | Vaughn | A61B 5/1123 |
| 2018/0288161 | A1* | 10/2018 | Saxena | G06N 20/00 |
| 2018/0321356 | A1* | 11/2018 | Kulkarni | G01S 5/14 |
| 2018/0330293 | A1* | 11/2018 | Kulkarni | G06K 19/0723 |
| 2018/0332434 | A1* | 11/2018 | Kulkarni | H04W 4/35 |
| 2019/0042086 | A1* | 2/2019 | White | G06Q 50/01 |
| 2019/0088098 | A1* | 3/2019 | Gangumalla | G01L 19/12 |
| 2019/0121782 | A1* | 4/2019 | Sun | G01D 21/02 |
| 2019/0347358 | A1* | 11/2019 | Mishra | G06F 16/332 |
| 2020/0134497 | A1* | 4/2020 | Salomon | G06N 20/00 |
| 2020/0159777 | A1* | 5/2020 | Weldemariam | H04L 67/306 |
| 2020/0242199 | A1* | 7/2020 | Ploennigs | G06F 40/35 |

* cited by examiner

EXAMPLE 1

QUERY: HOW MANY {#SENSOR(S)} DO I HAVE IN {$LOCATION(L)}

RESPONSE: THERE ARE {COUNT($SENSOR(S))} IN {$LOCATION(L)}

EXAMPLE 2

QUERY: WHAT IS INFLUENCING THE {#SENSOR(S)} IN {$LOCATION(L)}

RESPONSE: THE {#SENSOR(S)} IN {$LOCATION(L)} IS INFLUENCED BY {$SENSOR(T)}

INTELLIGENT MANAGEMENT AND INTERACTION OF A COMMUNICATION AGENT IN AN INTERNET OF THINGS ENVIRONMENT

BACKGROUND OF THE INVENTION

Field of the Invention

The present invention relates in general to computing systems, and more particularly to, various embodiments for managing and interacting with a conversational agent in an internet of things (IoT) environment using a computing processor.

Description of the Related Art

In today's society, consumers, businesspersons, educators, and others use various computing systems in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. Some computing systems may also include control systems that may include and/or associate with one or more physical sensors. Physical sensors may be used in many computers, machines, and/or products to measure and monitor physical phenomena, such as lighting or temperature. As great strides and advances in technologies come to fruition, these technological advances can be then brought to bear in everyday life. For example, the vast amount of available data made possible by computing and networking technologies may then assist in improvements to quality of life.

SUMMARY OF THE INVENTION

Various embodiments for managing and interacting with a conversational agent in an internet of things (IoT) environment by a processor, are provided. In one embodiment, by way of example only, a method for implementing intelligent management and interaction with a conversational agent in an internet of things (IoT) environment, again by a processor, is provided. One or more graph patterns may be extracted from a knowledge graph generated from a sensor list containing one or more IoT sensors. One or more conversation patterns and conversation dialogs may be learned from the sensor list and graph patterns. The conversational agent may be automatically configured with the one or more graph patterns, the one or more conversational patterns and conversation dialogs, sensor data and analytics from the one or more IoT sensors according to one or more queries to engage in a conversation dialog with a user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
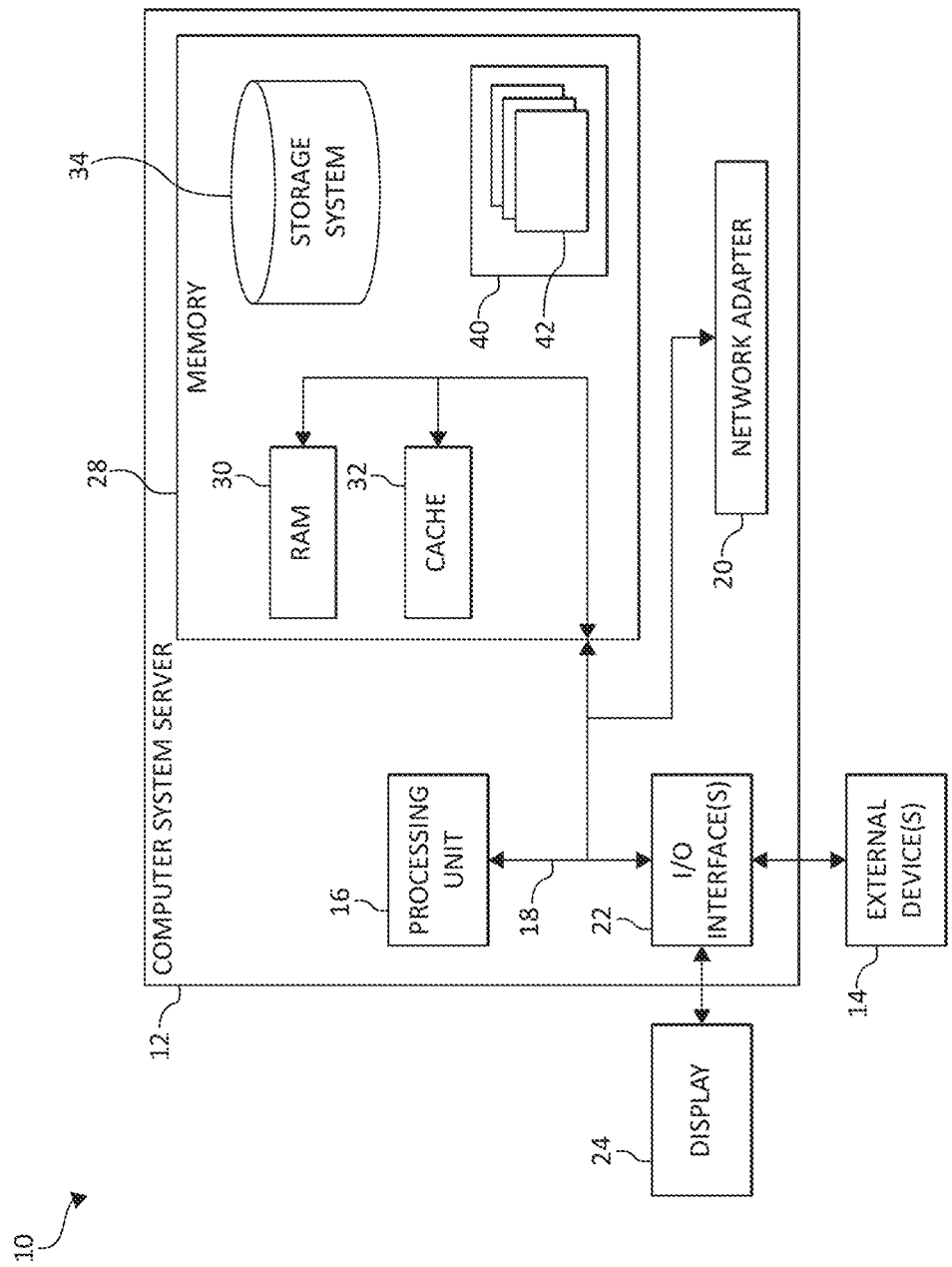
FIG. 1 is a block diagram depicting an exemplary cloud computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, home appliances, audio systems, televisions, security cameras, security sensors, among countless other examples. Such IoT computing systems may be employed in dialog systems, energy systems (e.g., energy grids), water networks, traffic networks, smart buildings, and the like. The prolific increase in use of IoT appliances in computing systems, particularly within the cloud computing environment, in a variety of settings provide various beneficial uses to a user. IoT systems can be highly customized and have complex internal and external interactions.

Moreover, dialog systems can play a key role in communication such as, for example, an organization, such as a business, government, group or other entity. For example, many critical decisions may result from discussions in chat systems, or chat-like conversation systems or chatbots. A conversational system or "dialog system" may be a computer system/conversation agent that converses with a human with a coherent structure. The conversation agent may employ text, speech, graphics, haptics, gestures, and/or other modes of communication on both an input and output channel. A chatbot may be an operation which conducts a dialog or conversation, audible, visual, and/or via textual methods. However, despite the wide use and application of IoT systems, current IoT systems are unable to automatically configure a conversational system nor automatically generate an intelligent automatic interface for the IoT system and the conversational system. For example, exhaustively considering all potential paths in a conversational system requires significant computing effort and resources resulting in scalability issues of configuring conversational systems to enable conversational interface management.

Accordingly, the present invention provides an intelligent management and interaction with a conversational agent in an internet of things (IoT) environment. One or more graph patterns may be extracted from a knowledge graph generated from a sensor list containing one or more IoT sensors. One or more conversation patterns and conversation dialogs may be learned from the sensor list and graph patterns. The conversational agent may be automatically configured with the one or more graph patterns, the one or more conversational patterns and conversation dialogs, sensor data and/or analytics from the one or more IoT sensors according to one or more queries to engage in a conversation dialog with a user.

In one aspect, by way of example only, the present invention provides for an intelligent system (e.g., a cognitive system) that automatically configures and feeds a conversational agent (e.g., a chatbot) for managing and interaction with one or more IoT systems by: 1) generating a configuration of the conversational agent from sensor list using graph patterns; 2) learning of one or more conversational patterns and dialog flows from various data (e.g., text examples); and 3) enriching the deployed conversational agent with real-time information and analytic to response to complex queries of the user. Additionally, the intelligent system may generate conversation paths (e.g., a required conversation path based on the sensor and conversation context) from a sensor list and knowledge graph that supports proactive conversational behavior. That is, for example, the conversational behavior may be proactive conversational behavior as compared to reactive conversational behavior. The reactive conversational behavior also known as ask/reply mode. The proactive conversational behavior refers to an operation where conversation dialog may be automatically generated (e.g., an artificial intelligent-generated conversational dialog) and/or where information may be provided without being asked or queried. That is, the intelligent system supports proactive conversational behavior by creating an intention to communicate depending on a current context of a task, one or more sensors from a sensor list, and/or the knowledge graph. The proactive conversational behavior may also include allowing a decision-making process to identify needed information, provide the information about the action and resource interdependencies with a task, one or more sensors from a sensor list, and/or the knowledge graph, and/or anticipate the needs of information for a task, one or more sensors from a sensor list, and/or the knowledge graph.

The intelligent system may learn one or more conversational patterns, dialog flow and training of classification approaches using one or more graph patterns. The intelligent system may manage and interact with an IoT system in real-time by linking and enriching the IoT system with appropriate, selected, and/or defined IoT data and analytic results.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
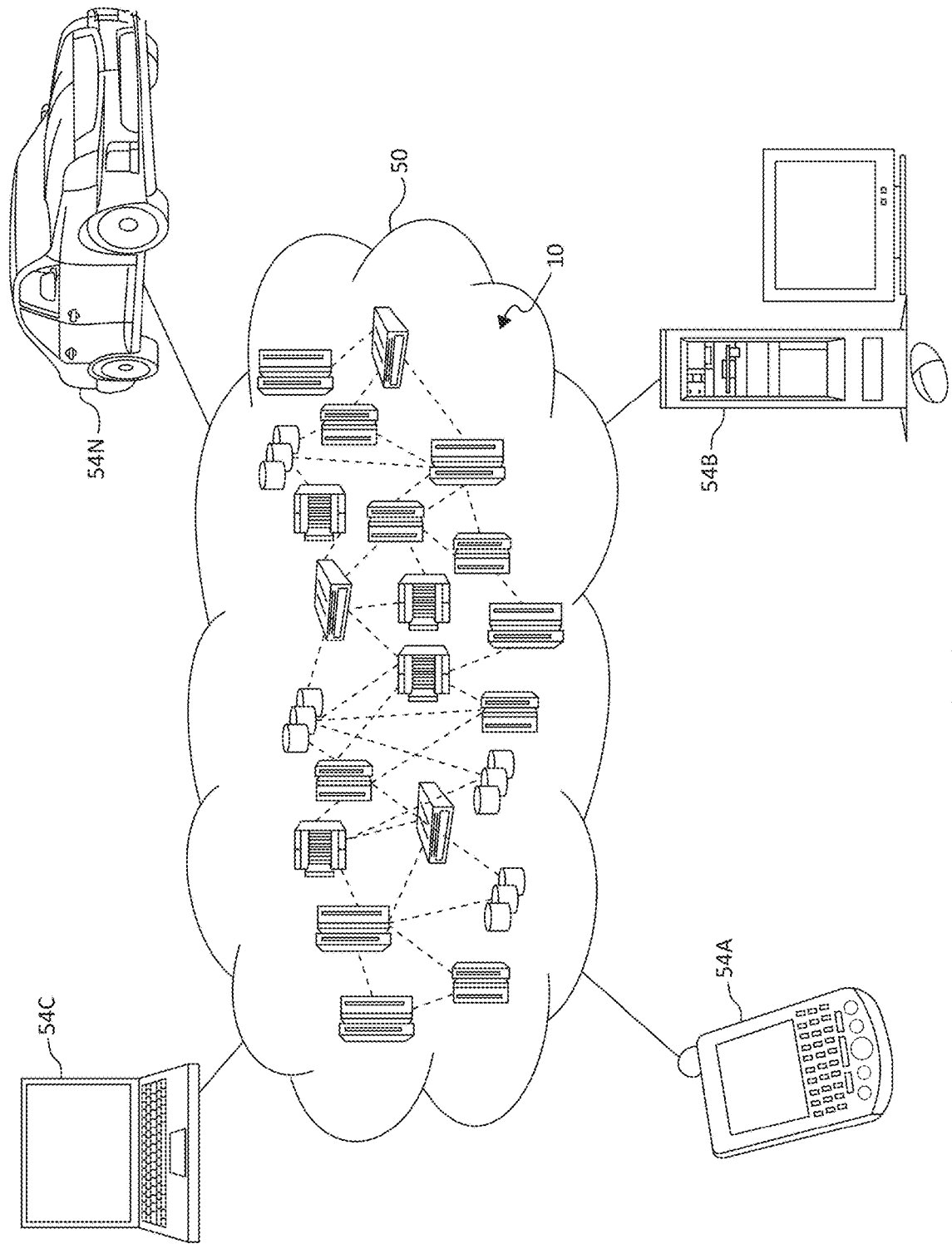
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
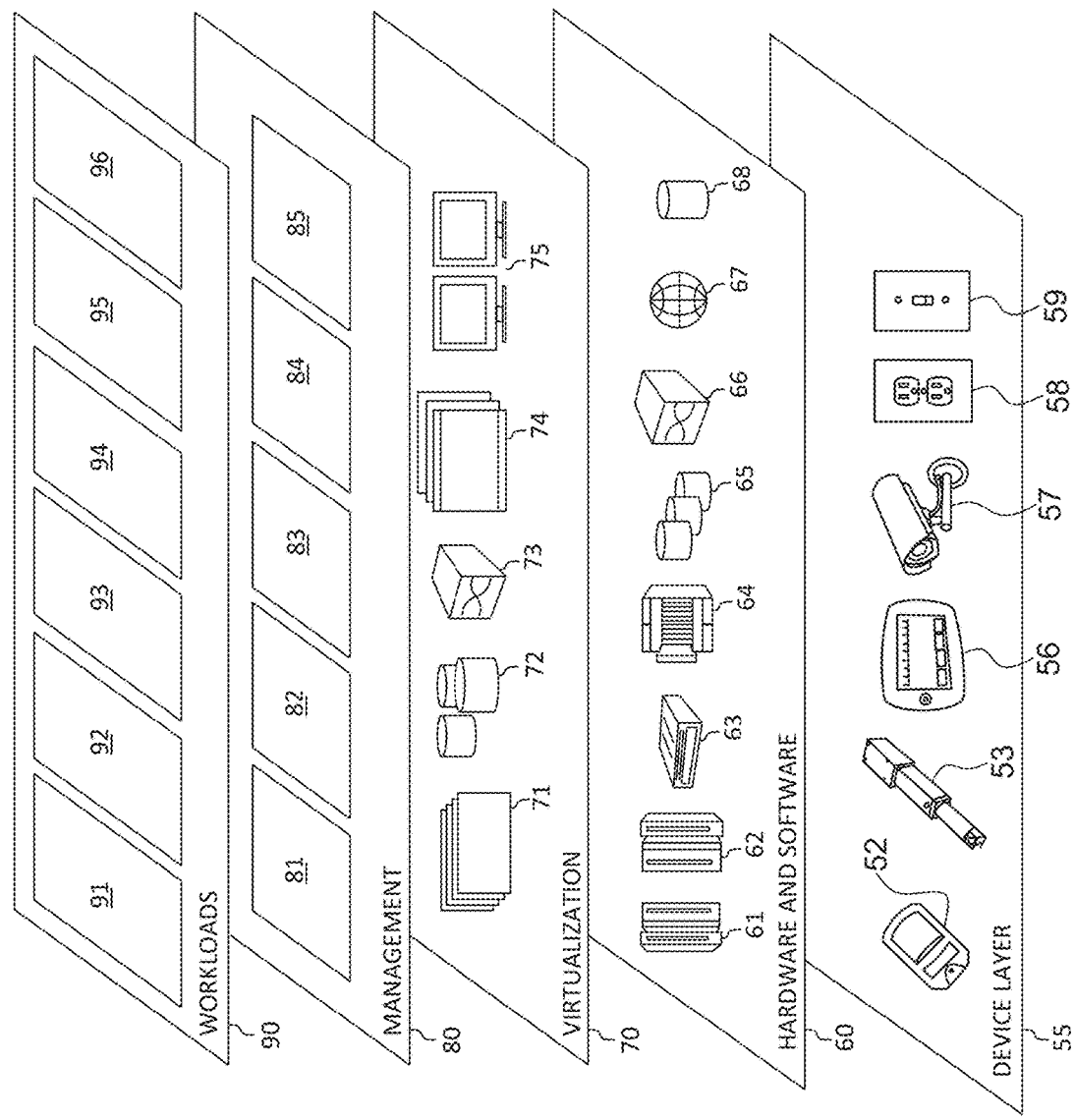
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and interacting with a conversational agent. In addition, workloads and functions 96 for managing and interacting with a conversational agent may include such operations as sensor data analytics, semantic graph creation and analysis, and as will be further described, virtual sensor module management functions. One of ordinary skill in the art will appreciate that the workloads and functions 96 for managing and interacting with a conversational agent may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As stated above, the present invention provides a novel solution for intelligent management and interaction with a conversational agent in an internet of things (IoT) environment. In one aspect, the present invention may apply a reasoning operation to generate a knowledge graph from a sensor list or list of IoT system components. One or more generic graph patterns may be applied to select one or more instances (e.g., potential instances) for conversational services and may extract one or more entities and intents. One or more conversational dialog examples may be learned for dialog patterns from textual examples that match one or more of the graph patterns. One or more conversational dialog elements may be generated from the dialog patterns. Generalized training examples may be generated for a conversational classifier associated with the conversational agent that covers, searches, and/or is associated with a complete/full graph. Conversational dialog flows/workflows may be generated from context dependencies in the graph. Conversational dialogs may be instantiated and matched to the graph to select the most likely dialog (e.g., dialog having a probability above a defined percentage or threshold) and one or more answers to a query in the conversational dialog may be identified in the knowledge graph.

In an additional aspect, as used herein, the knowledge graph may be a semantic knowledge graph may be automatically created. That is, the semantic graph may be created by linking observed and unobserved sensors by a physical process model with spatial and system context. One or more sensors may be determined by identifying observed and unobserved variables common to locations and/or IoT systems. Different graph patterns can be used such as, for example, spatial relationships, aggregation hierarchies, physical process models linking explanatory variables. In one aspect, the semantic knowledge graph describes a semantic function of each existing sensor and links the existing sensors to missing (if any) and/or non-existing sensors. A generic graph pattern may be used to determine and/or extract from the semantic knowledge graph locations.

Figure 4:
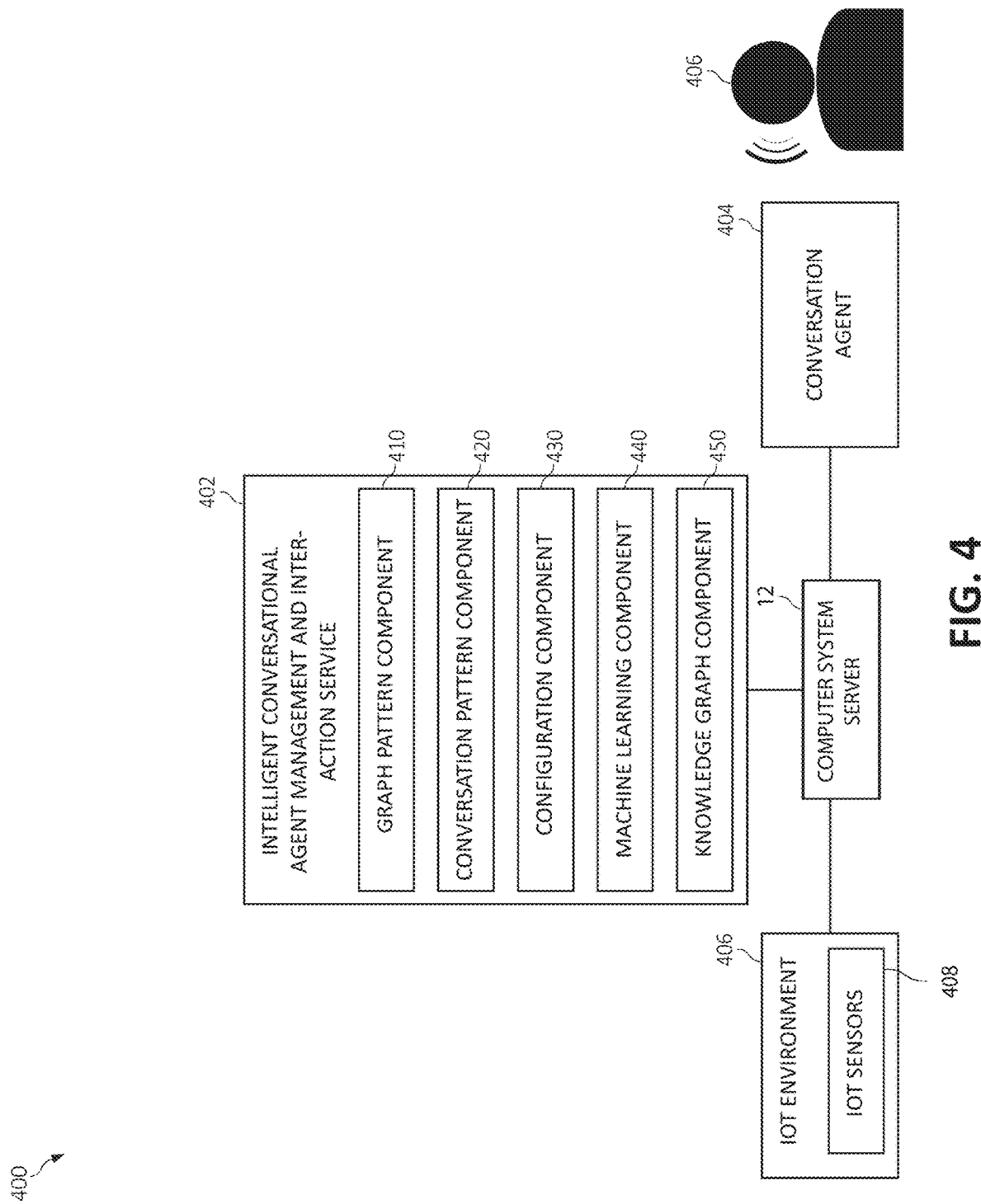
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. FIG. 4 illustrates workloads and functions for intelligent conversational agent management and interaction in a dialog system in a computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent resolution of conflicting information in a dialog system in accordance with the present invention. Many of the functional blocks of a cognitive system 400 may execute as background processes on various components, either in distributed computing components, or on the user device, or elsewhere. For example, computer system/server 12 may be employed along with processing unit 16 and memory 28 of FIG. 1 and not shown for illustrative convenience) to perform various computational, data processing and other functionality in accordance with various aspects of the present invention.

The cognitive system 400 may include an intelligent conversational agent management and interaction service 402 and a dialog system such as, for example, the conversation agent 404, which may be associated with an IoT environment 406 having one or more IoT sensors 408. The intelligent conversational agent management and interaction service 402 may include a graph pattern component 410, a conversation pattern component 420, a configuration component 430, a machine learning component 440, and/or a knowledge graph component 450.

The intelligent conversational agent management and interaction service 402 and the conversation agent 404 may each be associated with and/or in communication with each other, by one or more communication methods, such as a computing network. In one example, the intelligent conversational agent management and interaction service 402 and the conversation agent 404 may be controlled by an owner, customer, or technician/administrator associated with the computer system/server 12. Furthermore, the intelligent conversational agent management and interaction service 402 and the conversation agent 404 may each be associated with and/or in communication with one or more users such as, for example, user 460.

In one aspect, the computer system/server 12 may provide virtualized computing services (i.e., virtualized computing, virtualized storage, virtualized networking, etc.) to the intelligent conversational agent management and interaction service 402 and the conversation agent 404. More specifically, the computer system/server 12 may provide virtualized computing, virtualized storage, virtualized networking and other virtualized services that are executing on a hardware substrate.

In one aspect, the graph pattern component 410, in association with the knowledge graph component 450, may extract one or more graph patterns from a knowledge graph generated from a sensor list containing one or more IoT sensors 408. The knowledge graph includes a knowledge domain that links and describes semantic meanings, physical properties, and relationship between one or more IoT sensors 408 in the sensor list. The graph pattern component 410 may apply the one or more graph patterns to a knowledge graph to identify or select one or more instances or entities.

The graph pattern component 410 and/or the conversation pattern component 420, may define one or more graph patterns and one or more conversation dialog templates, wherein a conversation dialog template includes at least a query and a response template and associate one or more semantic concepts in the one or more graph patterns and the and one or more conversation dialog templates.

The conversation pattern component 420 may learn one or more conversation patterns and conversation dialogs from the sensor list and graph patterns. The conversation pattern component 420 may generate a conversational path from the sensor list and the knowledge graph.

The conversation pattern component 420 may generate one or more dialog elements from the one or more conversation patterns. In one aspect, a dialog element includes a query, a response, and a condition that indicates entities to be detected by a conversational classifier associated with the conversational agent. The conversation pattern component 420 may generate one or more conversational dialog workflows from context dependencies in the knowledge graph. The conversation pattern component 420 may instantiate and match one or more conversational dialogs to the knowledge graph to select a potential conversation dialog and identify one or more search results from the knowledge graph according to the one or more queries.

The configuration component 430 may configure the conversation agent 404 with the one or more graph patterns, the one or more conversational patterns and conversation dialogs, sensor data and analytics from the one or more IoT sensors 408 according to one or more queries to engage in a conversation dialog with the user 460. The configuration component 430 may monitor a dialog occurring between the user 460 using the conversation agent 404.

The configuration component 430 may describe and define a semantic function of each of the one or more IoT sensors and each location in the IoT environment according to the knowledge graph.

The machine learning component 440 may generate training data from one or more query templates and associated search results from the knowledge graph and train a conversational classifier associated with the conversational agent using the training data.

The knowledge graph component 450 may include a knowledge domain that may include a combination of domains, concepts, dialogs/conversations (including historical dialogs/conversations), discussions, relationships between the domains or concepts, machine learning data, features, parameters, data, profile data, historical data, tested and validated data, or other specified/defined data for identifying, monitoring, validating, detecting, learning, analyzing, monitoring, and/or maintaining data, concepts, and/or relationships between the concepts and/or components/sensors of IoT environment 406. The sensor list may be stored, maintained, and managed by the knowledge graph component 450.

In one aspect, the knowledge domain of the knowledge graph component 450 may may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to physical phenomena, environmental, scientific, industrial, educational, statistical data, medical, and/or biomedical-specific information. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

The conversation pattern component 420 may also search the knowledge graph component 450 to identify the one or more responses (e.g., from historical data/dialogs).

The graph pattern component 410 and/or the conversation pattern component 420 may also query (via the conversation agent 404) the users 460 to collect additional information in relation to a query.

The machine learning component 440 may initiate a machine learning to perform one or more machine learning operations to collect the user feedback, perform a semantic analysis on the dialogs/communications, train a classifier to classify the one or more queries, learn contextual data associated with the one or more queries, and collect and use a plurality of historical conversations of the dialog system.

The machine learning component 440 may perform one or more machine learning operations such as, for example, using natural language processing (NLP) and artificial intelligence (AI) to recognize conflicting information and/or understand a dialog of the user 460 from one or more utterances communicated to the conversation agent 404. The instances of the NLP or AI may include an instance of IBM® Watson®. (IBM® and Watson® are trademarks of International Business Machines Corporation).

The machine learning component 440 may perform one or more machine learning operation and learn information based on the feedback collected from one or more users via the feedback collection operation of the machine learning component 440. For example, one or more users may engage the dialog system and the machine learning component 440 may provide feedback to assist the graph pattern component 410 and/or the conversation pattern component 420 with one or more reasons, evidences, or responses. The machine learning component 440 may store the feedback information in the knowledge graph component 450 and may use the feedback data to learn and/or resolve conflicting information in future dialogs.

The machine learning component 440 may perform a machine learning operation for training and learning one or more machine learning models and also for learning, applying inferences, and/or reasoning pertaining to one or more users and queries/responses. In one aspect, the learning component 440 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Turning now to FIGS. 5A-5E, a block diagram of exemplary functionality 500 relating to generating conversation paths from a sensor list and knowledge graph that supports proactive conversational behavior in an internet of things (IoT) environment is depicted. In one aspect, many of the functional blocks previously described in FIGS. 1-4 may be applied and used for executing one or more operations and/or functionality described in FIGS. 5A-5E.

Figure 5A:
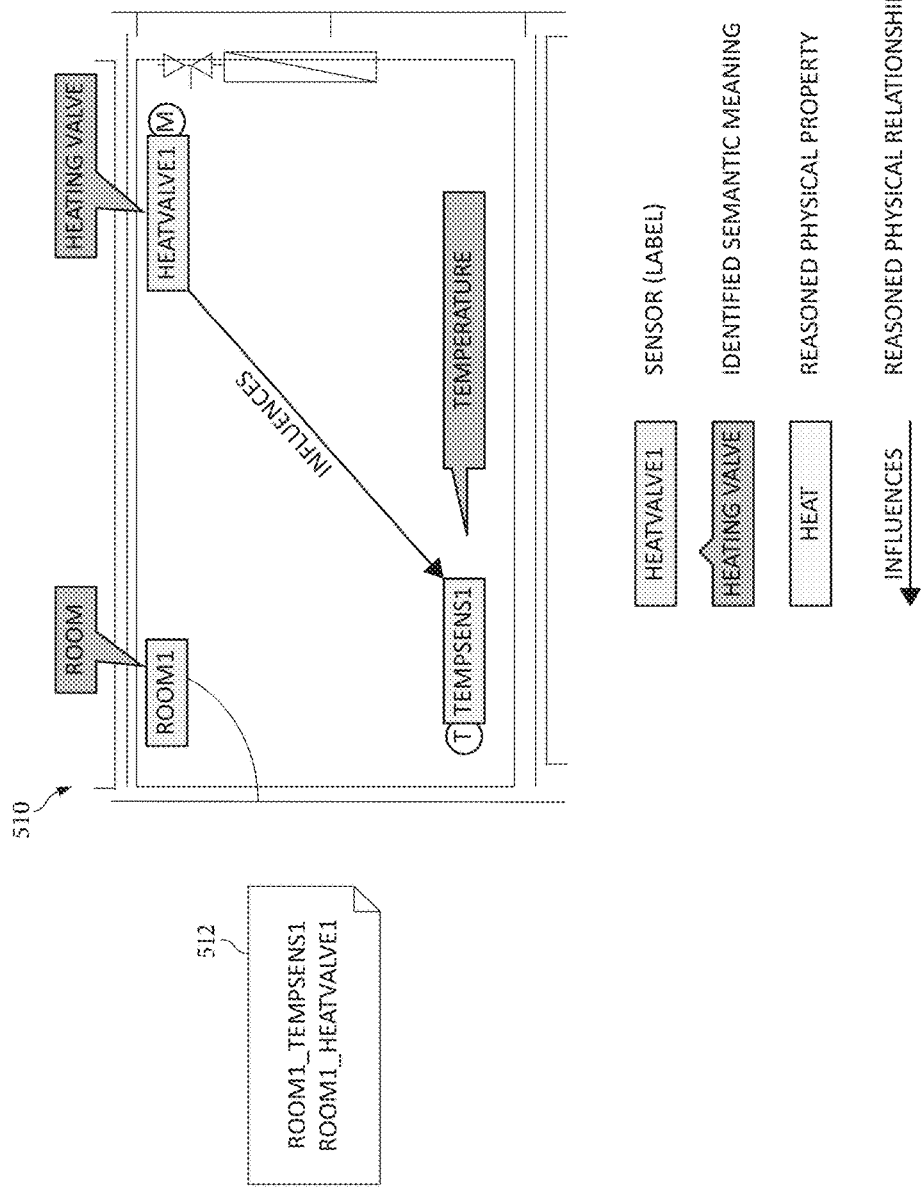
FIGS. 5A-5E are diagrams depicting generating conversation paths from a sensor list and knowledge graph that supports proactive conversational behavior in an internet of things (IoT) environment in which aspects of the present invention may be realized.

By way of example only, consider a semantic mapping for a knowledge graph 510 for a building having a plurality of rooms such as, for example, room 1 of N number of rooms as illustrated in diagram 500 of FIG. 5A. Assume a sensor list 512 describing one or more sensor labels (e.g., "HeatValve1" for a heat valve sensor) that encode one of a plurality of rooms (e.g., room 1) contains a temperature valve and a heating valve. For example, the sensor list may include the room and the sensor such as, for example, Room1_TempSens1 and Room1_HeatValve1 for the temperature sensor and heat sensor identified in Room 1.

A knowledge graph 510 (e.g., a semantic knowledge graph may be created/generated from a sensor list (e.g., a list of sensor in one of a plurality of rooms). For example, the semantic knowledge graph 510 may be created using one or more operations of US20150186777A1, hereby incorporated by reference.

A causal link may be created and/or identified between each sensor using physical knowledge. For example, the causal link may be created and/or identified between each sensor using physical knowledge using one or more operations of US20140163750A1, hereby incorporated by reference.

For example, a sensor label may be "heatvalve1" for a heating valve in room 1. An identified semantic meaning may be identified as "heating valve." A cognitive reasoning operation may be performed to reason that the physical property of the sensor is "heat." A cognitive reasoning operation may be performed to reason that one or more physical relationships of the sensor influences one or more linked or associated sensors such as, for example, a temperature sensor (e.g., "TempSens1").

Figure 5B:
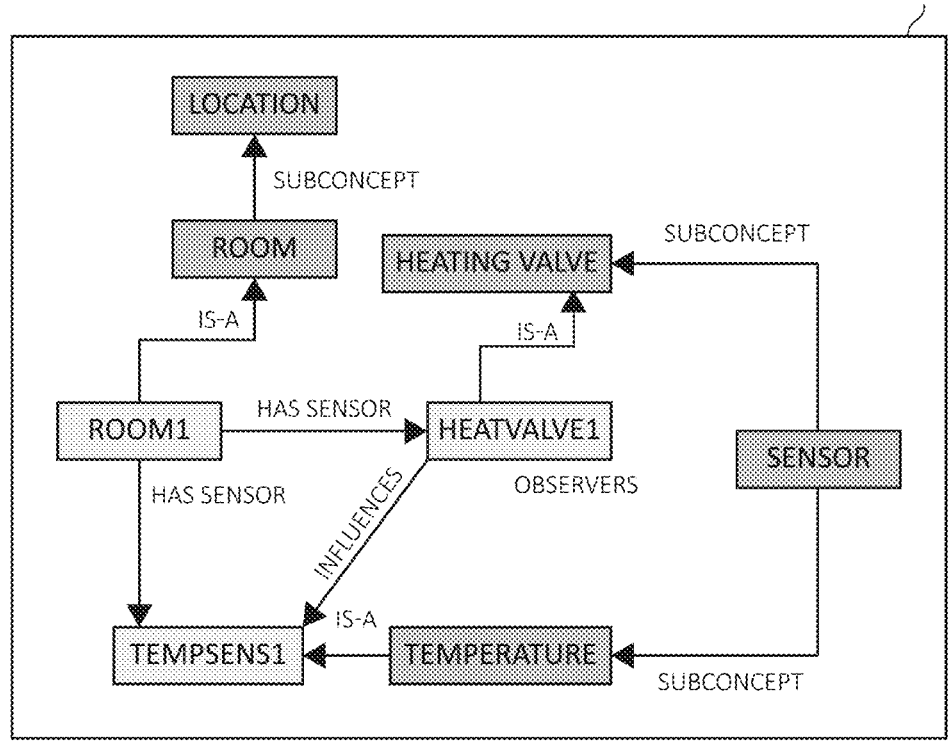

The resulting knowledge graph 510 is depicted in diagram 520 of FIG. 5B. The resulting knowledge graph 510 may describe a semantic function of each available sensor and all locations. For example, knowledge graph 510 depicts Room 1 has a heat valve sensor (e.g., "HeatValve1") and a temperature sensor (e.g., "TempSens1"). The heat valve sensor influences the temperature sensor. Temperature and heating valve are subconcepts of "sensor". Room 1 is a room, which is a subconcept of a location. The resulting knowledge graph 510 may be a subgraph of room 1 for the N number of rooms and may be used and applied, as illustrated in FIG. 5C.

Figure 5C:
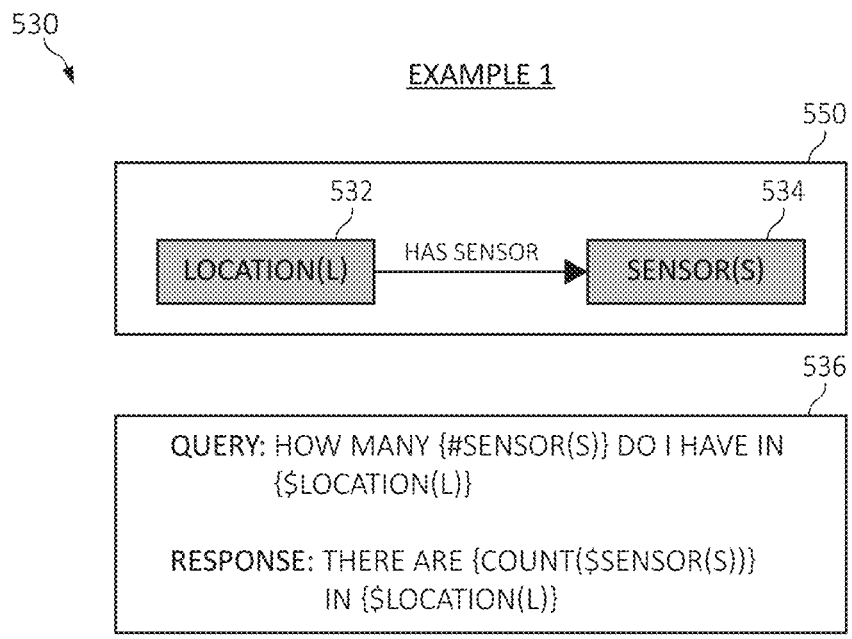
Figure 5C:
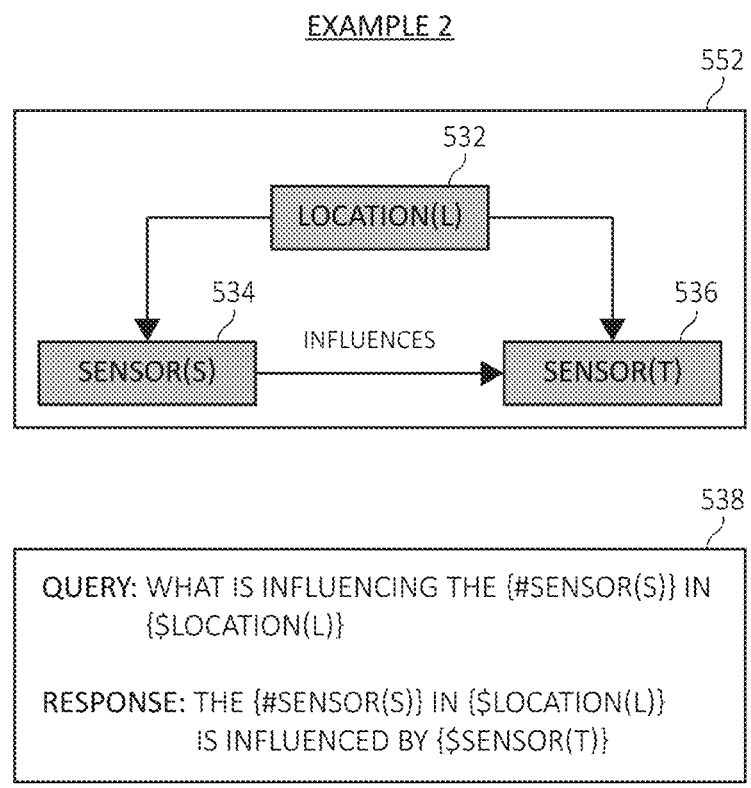

As illustrated in diagram 530 of FIG. 5C, a series of generic graph patterns 550 and 552 may be defined together with respective conversation templates such as, template 536 and 538 that may include a query/question and response template. Within the graph patterns 550 and 552 and templates 536 and 538, semantic concepts may be associated in the graph to variables. For example, such as, for example, a location "Location(L)" 532 includes a sensor "Sensor(S)" 534 as in Example 1 and Location(L) 532 includes a sensor "Sensor(S)" 534 and sensor "Sensor(T)" 536 and Sensor(T) 536 is influenced by Sensor(S) 534.

Also, as illustrated in templates 536 and 538, the concepts in the graph may be denoted as "#" and instances denoted with a "$" symbol. For example "{$Location(L)}" assigns all instances of concept "Location" to variable "L" while "{#Sensor(S)}" assigns all sub-concepts of 'Sensor' to variable "S".

Figure 5D:
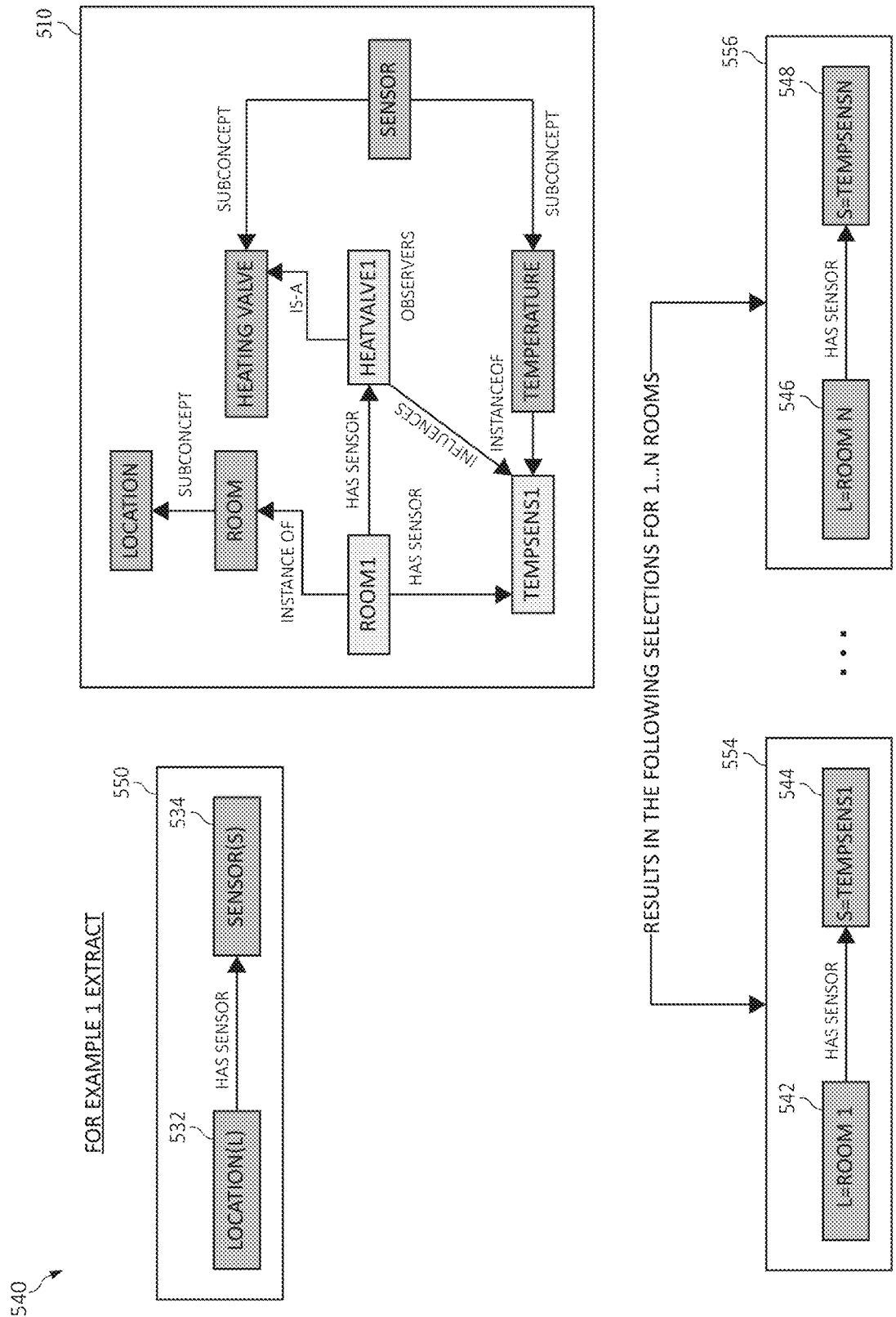
Figure 5E:
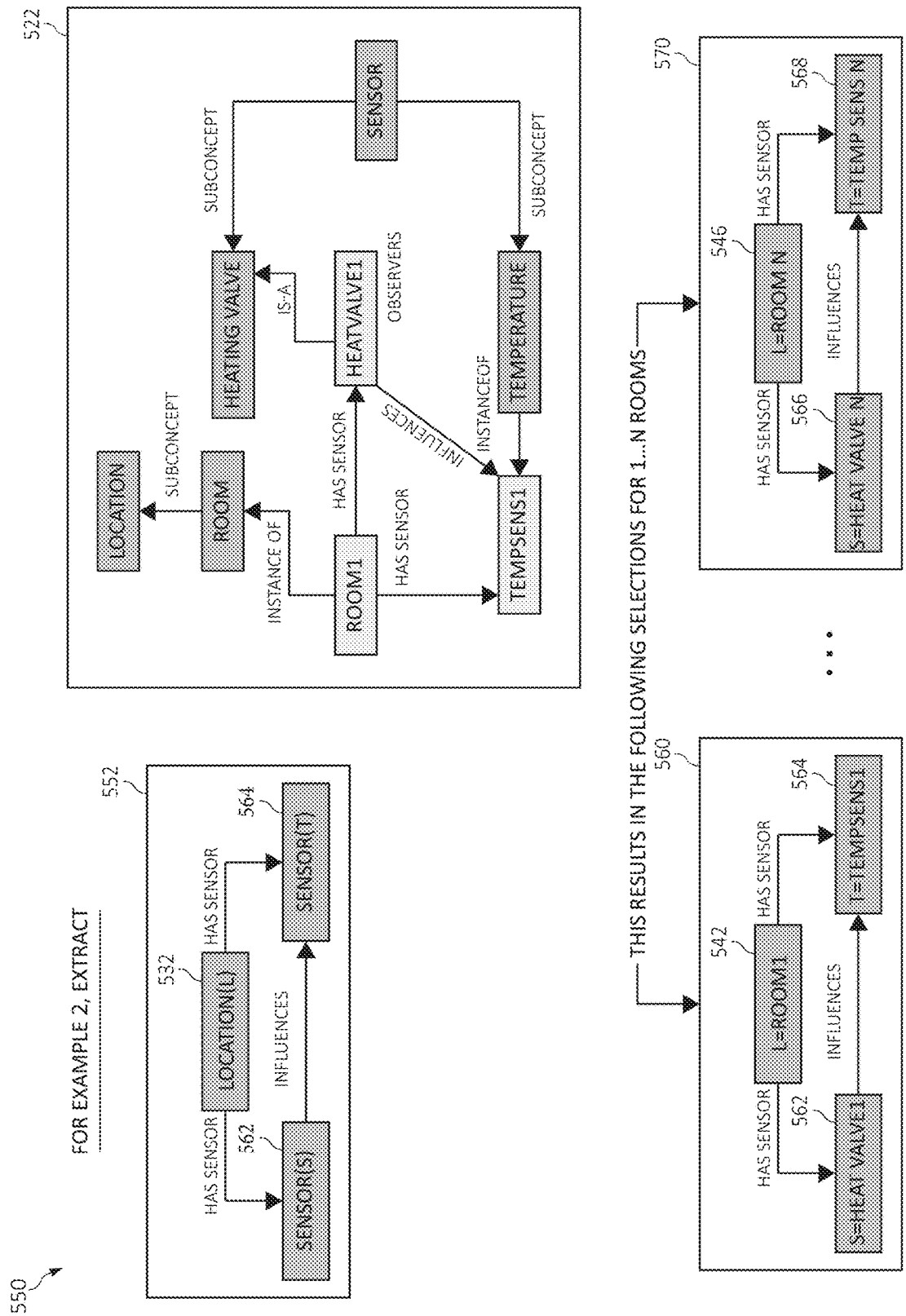

Turning now to diagram 540 of FIGS. 5D and 5E, the generic graph patterns (e.g., graph patterns 550 and 552) may be applied to the knowledge graph 510 (see also subgraph 520 of FIG. 5B) to select one or more potential instances for conversational services. The graph patterns can be predefined and also extracted from the graph automatically such as, for example, by using common graph statistics (e.g., connectivity).

For example, in example 1 (e.g., from FIG. 5C) illustrated in FIG. 5D (using knowledge graph 510), data indicating location "Location(L)" 532 includes a sensor "Sensor(S)" 534 may be extracted. This results in the following selections 554 and 556 for room 1 of the N number of rooms that location 542 of room 1 (e.g., L=Room 1) has a sensor S in room 1 that is equal to the temperature sensor (e.g., S=TempSens1) and location 546 of room N (e.g., L=Room N) has a sensor S in room N that is equal to the temperature sensor (e.g., S=TempSensN).

In example 2 (e.g., from FIG. 5C) illustrated in FIG. 5E, data indicating location "Location(L)" 532 includes a sensor "Sensor(S)" 562 and "Sensor(T)" 564 (where Sensor(S) influences Sensor(T)) may be extracted. This results in the following selections for room 1 of the N number of rooms that location 542 of room 1 (e.g., L=Room 1) has a sensor S 562 in room 1 that is equal to the heating valve sensor (e.g., S=HeatValve1) and a sensor T 564 in room 1 that is equal to the temperature sensor 564 (e.g., S=TempSens1), where the heating valve sensor 562 influences the temperature sensor 564. The location 546 of room N (e.g., L=Room N) has a sensor S 566 in room N that is equal to the sensor S 566 (e.g., heating valve sensor 566 where sensor "S" is S=HeatValveN) and a sensor T 568 in room 1 that is equal to the sensor T 568 (e.g., temperature sensor 568 and where sensor "S" is S=TempSens1), where the heating valve sensor 562 influences the sensor T 568 (e.g., temperature sensor).

It should be noted that one or more entities may be used in the conversational agent of a conversation systems to identify what keywords can be queried (e.g., asked). For example, using the query definition of example 1 and example 2 of FIGS. 5A-5E, it is known that are the variables of "{#Location(L)}," "{#Sensor(S)}," and "{$Sensor(T)}". From the query results from FIGS. 5A-5E, the present invention may extract all instances for the entities such as, for example, $Location={room1, . . . , roomN}, #Sensor={Sensor, Temperature, Heating Valve}, and/or $Sensor={TempSens1, . . . , TempSensN, HeatValve1, . . . , HeatValveN}.

An Artificial Neural Network ("ANN"), which may function as conversational classifier associated with a conversational agent, may be trained to identify the intents. For training the conversational classifier (e.g., the ANN), training data that may be automatically generated by creating examples of the query templates with the graph search results may be used. The query for example 1 (e.g., query 536) is given as "How many {#Sensor(S)} do I have in {$Location(L)}."

By filling in samples from the previously identified graph search results of FIGS. 5D and 5E, the following examples may be generated/retrieved such as, for example: 1) "How many 'Sensor' do I have in 'room1'," 2) "How many 'Temperature' do I have in 'room1'," 3) "How many 'Heating Valve' do I have in 'room1'," 4) "How many 'Sensor' do I have in 'roomN'," 5) "How many 'Temperature' do I have in 'roomN'," 6) "How many 'Heating Valve' do I have in 'roomN'."

Figure 6:
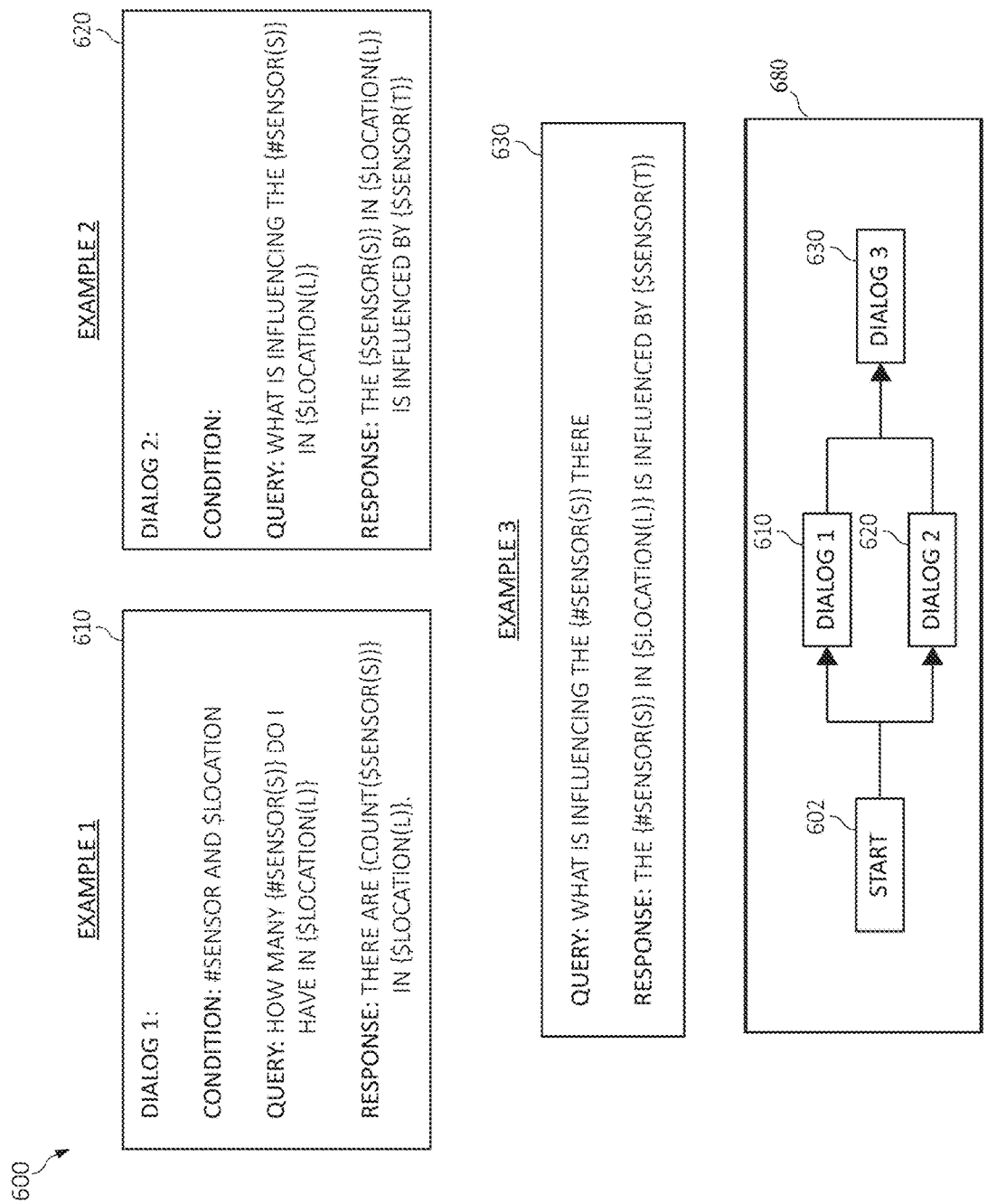
FIG. 6 is an additional block diagrams depicting generating conversational dialog flows from dialog patterns and from context dependencies in accordance with aspects of the present invention.

At this point, the present invention may now generate conversational dialog flows from dialog patterns and from context dependencies, as illustrated in diagram 600 of FIG. 6. As will be seen, many of the functional blocks may also be considered "modules" or "components" of functionality, in the same descriptive sense as has been previously described in FIGS. 1-5A-5E. Repetitive description of like elements employed in other embodiments described herein (e.g., FIGS. 1-5A-5E) is omitted for sake of brevity.

FIG. 6 depicts generating conversational dialog elements from the dialog patterns such as, for example, by using the previously defined templates (e.g., dialog template 536 and 538) for queries and responses per graph pattern. Each combination of the queries and responses may be mapped onto one generated dialog element. A dialog element (e.g., dialog elements 610, 620, and 630) may include a query, a response and a condition that encodes which entities need to be detected by a natural language classifier (e.g., a machine learning operation associated with a conversational agent) that is to be trained.

For the two examples (e.g., example 1 and example 2 of FIGS. 5A-5E), dialog element 610 and dialog element 620 may be generated. For example, dialog element 610 includes the query "How many {#Sensor(S)} do I have in {$Location (L)}", a response "there are {COUNT($Sensor(S)) }in{$Location(L)}, and a condition #Sensor AND $Location. Dialog element 620 includes, for example, the query "What is influencing the {#Sensor(S)} in {$Location(L)}", the response "The ($Sensor(S))}in{$Location(L)} is influenced by {$Sensor(T)}.

Turning now to example 3 in FIG. 6, the present invention may also generate conversational dialog flows from context dependencies in the knowledge graph (e.g., knowledge graph 510 of FIG. 5A). For example, it is normal and common in natural language dialogs that a user may have follow up questions/queries that reuse previously defined context. The context may be the entities that may have been defined in one or more previous questions. Accordingly, example 3 illustrates redefining or "rephrasing" query 2 of dialog element 620 (e.g., example 2) as a follow up question in dialog element 630 of example 3. For example, example 3 illustrates rephrasing the question/query as: Query: What is influencing the {#Sensor(S)} there. The response of dialog element 630 may be: The {#Sensor(S)} in {$Location (L)} is influenced by {$Sensor(T)}.

In the question/query of example 3 of dialog element 630, the location is based on the context and is not explicitly defined, but, needs to be retrieved from a previously dialog. The location may be previously defined in example 1 of dialog element 610 and example 2 of dialog element 620. Thus, the new dialog element 630 can only follow after example 1 of dialog element 610 and/or example 2 of dialog element 620. Each of the dependencies may be analyzed and generate a dialog flow. For example, dialog flow 680 may start at block 602 with dialog 1 of dialog element 610 being performed simultaneously and/or in parallel with dialog 2 of dialog element 620. Dialog 3 of dialog element 630 is dependent on either dialog 1 of dialog element 610 being performed simultaneously and/or in parallel with dialog 2 of dialog element 620.

Figure 7:
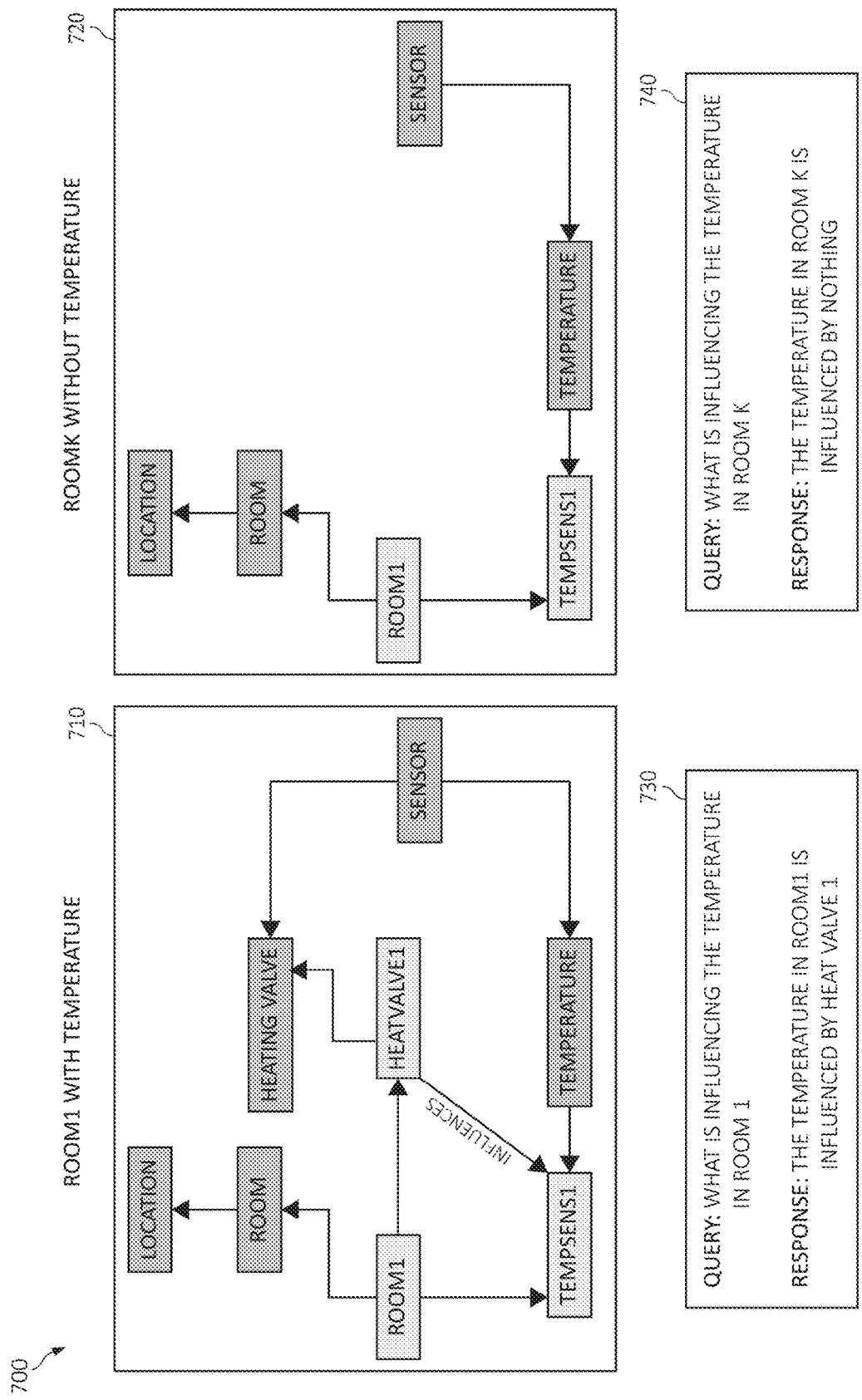
FIG. 7 is an additional block diagram depicting instantiating conversational dialogs and matching them to a knowledge graph to select a conversational dialog and to identify answers in the knowledge graph in an internet of things (IoT) environment in which aspects of the present invention may be realized.

Given the previously automatically configured natural language classifier and dialog workflow 680, one or more queries from the user may be detected and answers, as illustrated in diagram 700 of FIG. 7. That is, FIG. 7 depicts instantiating conversational dialogs and matching them to a knowledge graph to select a conversational dialog and to identify answers in the knowledge graph in the IoT environment.

As illustrated in FIG. 7, consider a knowledge graph 710, associated with a dialog 730 (e.g., dialog element 730), for room 1 with a heating valve sensor and temperature sensor (e.g., Room 1 with temperature). For example, dialog 730 includes:
Query: What is influencing the Temperature in room 1?
Response: The Temperature in Room 1 is influenced by HeatValve 1

Also consider knowledge graph 720, associated with dialog 740 (e.g., dialog element 740) for room K having a temperature sensor but no heating valve sensor (e.g., Room K without temperature). For example, dialog 740 includes:
Query: What is influencing the Temperature in Room K?
Response: The Temperature in Room K is influenced by nothing It should be noted that the answer to each query of dialogs 730 and 740 may be dependent upon the state in the respective knowledge graph (e.g., knowledge graph 710 for query 730 and knowledge graph 720 for dialog 740). For example, consider both Room 1 with a heating value and Room K that does not have a Heating Valve. Accordingly, the query results (of dialogs 730 and 740) are different for both rooms based on the different states (e.g., the state of having a heating valve in Room 1 and the state of not having a heating valve in Room K).

Figure 8:
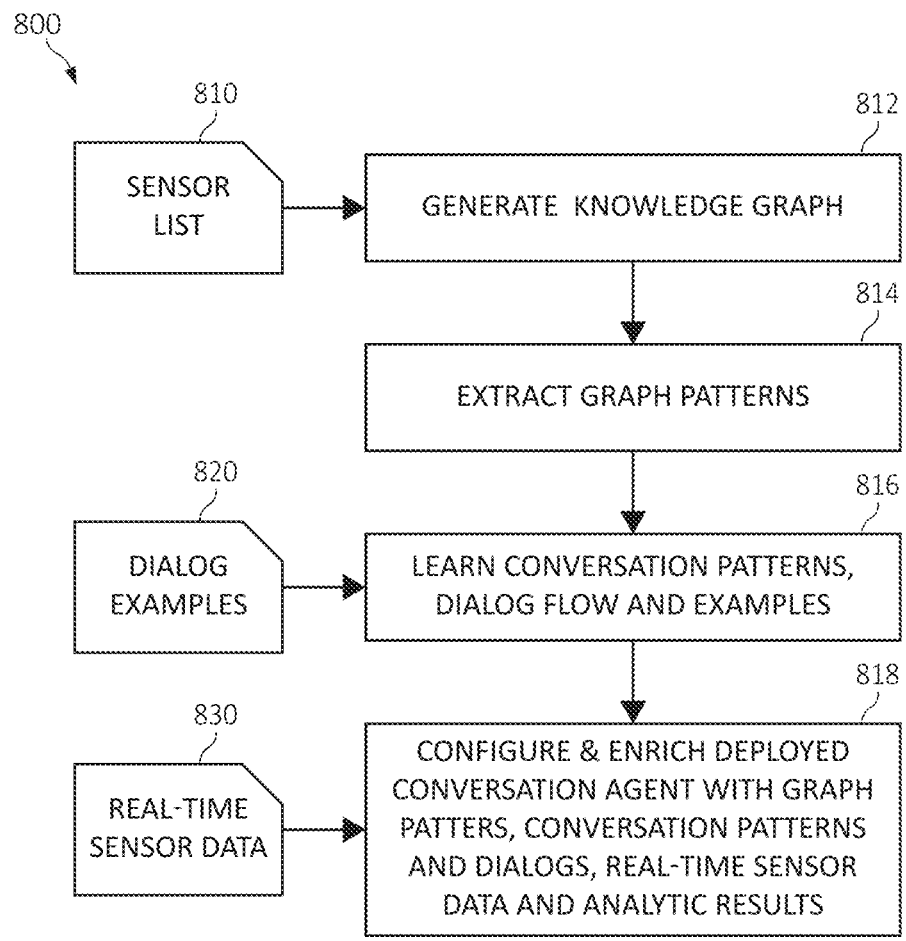
FIG. 8 is a flowchart diagram depicting an exemplary method for managing and interacting with a conversational agent in an internet of things (IoT) environment in which aspects of the present invention may be realized.

Turning now to FIG. 8, a method 800 for managing and interacting with a conversational agent in an IoT environment is depicted, in which various aspects of the illustrated embodiments may be implemented. The functionality 800 may be implemented as a method executed as instructions on a machine, where the instructions are included on at least one computer readable medium or one non-transitory machine-readable storage medium.

The functionality 800 may start by using data from a sensor list 810 and a knowledge graph may be generated, as in block 812. That is, a conversation paths from a sensor list and knowledge graph that supports proactive conversational behavior may be built/generated. One or more graph patterns may be extracted from the knowledge graph, as in block 814. One or more conversational patterns, dialog flows, and/or dialog examples 820 (e.g., conversation dialogs and/or training of classification examples using graph patterns) may be learned, as in block 816. For example, conversational patterns and dialog flows may be learned from text examples and/or training examples for a conversational classifier associated with the conversation agent may be learned and generated for the knowledge graph. Configure and enrich a conversation agent (e.g., a chat bot) with graph patterns, conversation patterns, conversation dialogs, real-time sensor data 830, and/or analytic results, as in block 818. For example, one or more IoT systems may be managed and interacted with in real-time by linking and enriching the IoT systems with appropriate IoT data and analytic results.

Figure 9:
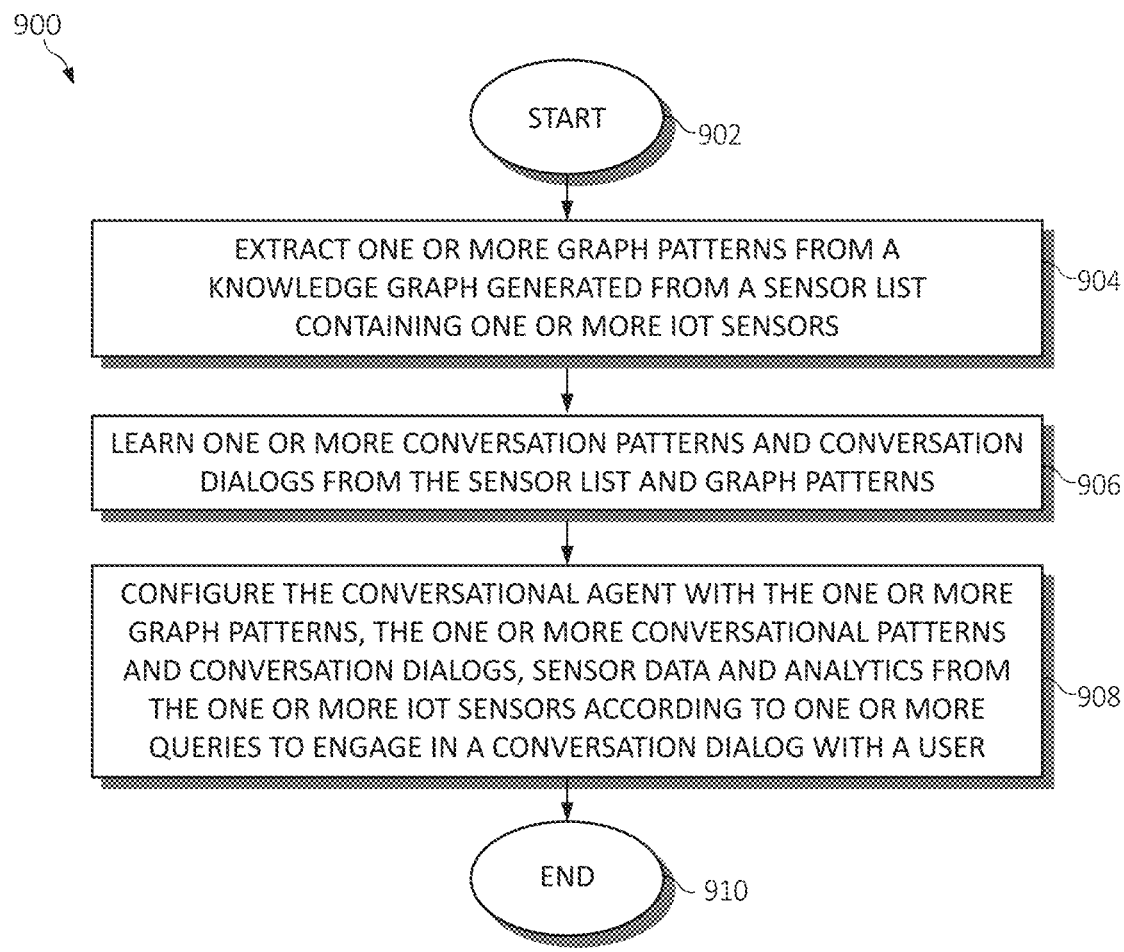
FIG. 9 is a flowchart diagram depicting an exemplary method for managing and interacting with a conversational agent in an internet of things (IoT) environment in which aspects of the present invention may be realized.

Turning now to FIG. 9, a method 900 for managing and interacting with a conversational agent in an IoT environment is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902.

One or more graph patterns may be extracted from a knowledge graph generated from a sensor list containing one or more IoT sensors, as in block 904. One or more conversation patterns and conversation dialogs may be learned from the sensor list and graph patterns, as in block 906. The conversational agent may be automatically configured with the one or more graph patterns, the one or more conversational patterns and conversation dialogs, sensor data and analytics from the one or more IoT sensors according to one or more queries to engage in a conversation dialog with a user, as in block 908. The functionality 900 may end, as in block 910.

In one aspect, in conjunction with and/or as part of at least one block of FIG. 9, the operation of 900 may include each of the following. The operation of 900 may include generate a conversational path from the sensor list and the knowledge graph, wherein the knowledge graph includes a knowledge domain that links and describes semantic meanings, physical properties, and relationship between one or more IoT sensors in the sensor list.

The operation of 900 may include describe and define a semantic function of each of the one or more Iot sensors and each location in the IoT environment according to the knowledge graph. The operation of 900 may include define the one or more graph patterns and one or more conversation dialog templates. The conversation dialog template includes at least a query and a response template, and/or associate one or more semantic concepts with in the one or more graph patterns and the and one or more conversation dialog templates.

The operation of 900 may apply the one or more graph patterns to the knowledge graph to identify or select one or more instances or entities. The operation of 900 may generate training data from one or more query templates and associated search results from the knowledge graph, and/or train a conversational classifier associated with the conversational agent using the training data.

The operation of 900 may include generate one or more dialog elements from the one or more conversation patterns, wherein a dialog element includes a query, a response, and a condition that indicates entities to be detected by a conversational classifier associated with the conversational agent, generate one or more conversational dialog workflows from context dependencies in the knowledge graph, and/or instantiate and match one or more conversational dialogs to the knowledge graph to select a potential conversation dialog and identify one or more search results from the knowledge graph according to the one or more queries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for managing and interacting with a conversational agent in an internet of things (IoT) environment, comprising:
    extracting one or more graph patterns from a knowledge graph generated from a sensor list containing one or more IoT sensors, wherein the knowledge graph is automatically created by linking observed and unobserved IoT sensors by a physical process model having spatial system-wide context of the IoT environment, and wherein the sensor list is initially empty and automatically generated by identifying observed and unobserved variables common to a specific location in the IoT environment based on iterative queries to the conversational agent such that the sensor list is iteratively generated over time according to the iterative queries;
    learning one or more conversation patterns and conversation dialogs from the sensor list and graph patterns; and
    configuring the conversational agent with the one or more graph patterns, the one or more conversational patterns and conversation dialogs, sensor data and analytics from the one or more IoT sensors according to one or more queries to engage in a conversation dialog with a user, wherein configuring the conversational agent includes automatically learning a relationship between the one or more IoT sensors in the sensor list and inferring an influence of the relationship upon the physical environment of the user.

2. The method of claim 1, further including generating a conversational path from the sensor list and the knowledge graph, wherein the knowledge graph includes a knowledge domain that links and describes semantic meanings, physical properties, and the relationship between one or more IoT sensors in the sensor list.

3. The method of claim 1, further including describing and defining a semantic function of each of the one or more IoT sensors and each location in the IoT environment according to the knowledge graph.

4. The method of claim 1, further including:
    defining the one or more graph patterns and one or more conversation dialog templates, wherein a conversation dialog template includes at least a query and a response template; and
    associating one or more semantic concepts with the one or more graph patterns and the and one or more conversation dialog templates.

5. The method of claim 1, further including applying the one or more graph patterns to the knowledge graph to identify or select one or more instances or entities.

6. The method of claim 1, further including:
generating training data from one or more query templates and associated search results from the knowledge graph; and
training a conversational classifier associated with the conversational agent using the training data.

7. The method of claim 1, further including:
generating one or more dialog elements from the one or more conversation patterns, wherein a dialog element includes a query, a response, and a condition that indicates entities to be detected by a conversational classifier associated with the conversational agent;
generating one or more conversational dialog workflows from context dependencies in the knowledge graph; or
instantiating and matching one or more conversational dialogs to the knowledge graph to select a potential conversation dialog and identify one or more search results from the knowledge graph according to the one or more queries.

8. A system for managing and interacting with a conversational agent in an internet of things (IoT) environment, comprising:
one or more computers with executable instructions that when executed cause the system to:
extract one or more graph patterns from a knowledge graph generated from a sensor list containing one or more IoT sensors, wherein the knowledge graph is automatically created by linking observed and unobserved IoT sensors by a physical process model having spatial system-wide context of the IoT environment, and wherein the sensor list is initially empty and automatically generated by identifying observed and unobserved variables common to a specific location in the IoT environment based on iterative queries to the conversational agent such that the sensor list is iteratively generated over time according to the iterative queries;
learn one or more conversation patterns and conversation dialogs from the sensor list and graph patterns; and
configure the conversational agent with the one or more graph patterns, the one or more conversational patterns and conversation dialogs, sensor data and analytics from the one or more IoT sensors according to one or more queries to engage in a conversation dialog with a user, wherein configuring the conversational agent includes automatically learning a relationship between the one or more IoT sensors in the sensor list and inferring an influence of the relationship upon the physical environment of the user.

9. The system of claim 8, wherein the executable instructions generate a conversational path from the sensor list and the knowledge graph, wherein the knowledge graph includes a knowledge domain that links and describes semantic meanings, physical properties, and the relationship between one or more IoT sensors in the sensor list.

10. The system of claim 8, wherein the executable instructions describe and define a semantic function of each of the one or more IoT sensors and each location in the IoT environment according to the knowledge graph.

11. The system of claim 8, wherein the executable instructions:
define the one or more graph patterns and one or more conversation dialog templates, wherein a conversation dialog template includes at least a query and a response template; and
associate one or more semantic concepts with the one or more graph patterns and the and one or more conversation dialog templates.

12. The system of claim 8, wherein the executable instructions apply the one or more graph patterns to the knowledge graph to identify or select one or more instances or entities.

13. The system of claim 8, wherein the executable instructions:
generate training data from one or more query templates and associated search results from the knowledge graph; and
train a conversational classifier associated with the conversational agent using the training data.

14. The system of claim 8, wherein the executable instructions:
generate one or more dialog elements from the one or more conversation patterns, wherein a dialog element includes a query, a response, and a condition that indicates entities to be detected by a conversational classifier associated with the conversational agent;
generate one or more conversational dialog workflows from context dependencies in the knowledge graph; or
instantiate and match one or more conversational dialogs to the knowledge graph to select a potential conversation dialog and identify one or more search results from the knowledge graph according to the one or more queries.

15. A computer program product for automatically generating a container image by a processor, the computer program product comprising a non-transitory computer-readable storage medium having computer-readable program code portions stored therein, the computer-readable program code portions comprising:
an executable portion that extracts one or more graph patterns from a knowledge graph generated from a sensor list containing one or more IoT sensors, wherein the knowledge graph is automatically created by linking observed and unobserved IoT sensors by a physical process model having spatial system-wide context of the IoT environment, and wherein the sensor list is initially empty and automatically generated by identifying observed and unobserved variables common to a specific location in the IoT environment based on iterative queries to the conversational agent such that the sensor list is iteratively generated over time according to the iterative queries;
an executable portion that learns one or more conversation patterns and conversation dialogs from the sensor list and graph patterns; and
an executable portion that configures the conversational agent with the one or more graph patterns, the one or more conversational patterns and conversation dialogs, sensor data and analytics from the one or more IoT sensors according to one or more queries to engage in a conversation dialog with a user, wherein configuring the conversational agent includes automatically learning a relationship between the one or more IoT sensors in the sensor list and inferring an influence of the relationship upon the physical environment of the user.

16. The computer program product of claim 15, further including an executable portion that generates a conversational path from the sensor list and the knowledge graph, wherein the knowledge graph includes a knowledge domain that links and describes semantic meanings, physical properties, and the relationship between one or more IoT sensors in the sensor list.

17. The computer program product of claim 15, further including an executable portion that describes and defines a semantic function of each of the one or more Tot sensors and each location in the IoT environment according to the knowledge graph.

18. The computer program product of claim 15, further including an executable portion that:
  defines the one or more graph patterns and one or more conversation dialog templates, wherein a conversation dialog template includes at least a query and a response template; and
  associates one or more semantic concepts with the one or more graph patterns and the and one or more conversation dialog templates; or
  applies the one or more graph patterns to the knowledge graph to identify or select one or more instances or entities.

19. The computer program product of claim 15, further including an executable portion that:
  generates training data from one or more query templates and associated search results from the knowledge graph; and
  trains a conversational classifier associated with the conversational agent using the training data.

20. The computer program product of claim 15, further including an executable portion that:
  generates one or more dialog elements from the one or more conversation patterns, wherein a dialog element includes a query, a response, and a condition that indicates entities to be detected by a conversational classifier associated with the conversational agent;
  generates one or more conversational dialog workflows from context dependencies in the knowledge graph; or
  instantiates and matches one or more conversational dialogs to the knowledge graph to select a potential conversation dialog and identify one or more search results from the knowledge graph according to the one or more queries.

\* \* \* \* \*